Figure 1:
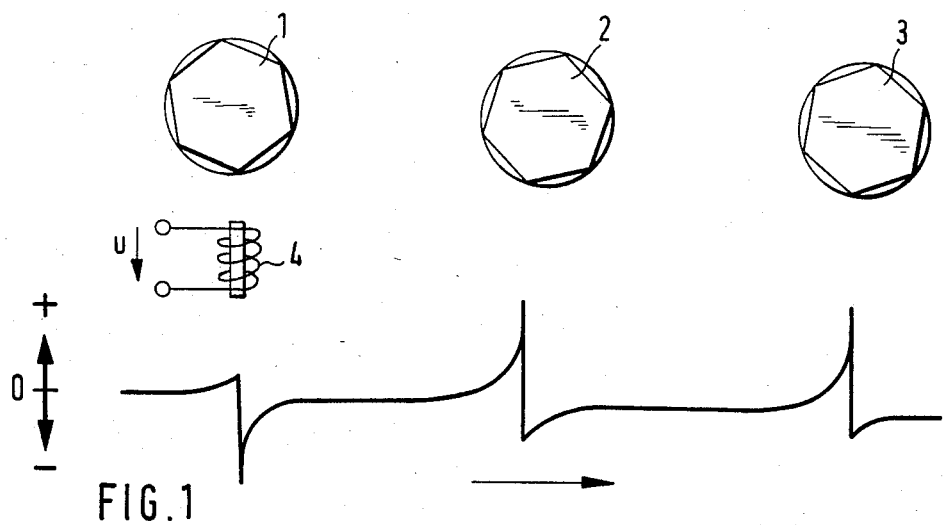

United States Patent [19]

Kolitsch et al.

[11] Patent Number: 4,591,784
[45] Date of Patent: May 27, 1986

[54] EXAMINATION PROCEDURE FOR THE SPATIAL CHANGE OF AN OBJECT WITH RESPECT TO ITS INITIAL CONDITION

[75] Inventors: Jörg Kolitsch; August Miehle, both of Munich, Fed. Rep. of Germany

[73] Assignee: Bayerische Motoren Werke AG, Fed. Rep. of Germany

[21] Appl. No.: 452,030

[22] Filed: Dec. 22, 1982

[30] Foreign Application Priority Data

Dec. 24, 1981 [DE] Fed. Rep. of Germany ....... 3151265
Nov. 5, 1982 [DE] Fed. Rep. of Germany ....... 3240948

[51] Int. Cl.⁴ .................. G01B 7/28; G01B 11/24; G01B 17/00; G01B 7/14
[52] U.S. Cl. ...................................... 324/208; 73/660; 324/226; 324/227; 340/680; 356/390
[58] Field of Search ............... 324/207, 208, 226, 227, 324/224, 232, 233–243; 73/660, 661, 761; 356/390; 364/559, 560; 340/679, 680

[56] References Cited

U.S. PATENT DOCUMENTS

| | | | |
|---|---|---|---|
| 3,810,002 | 5/1974 | Sata | 324/236 |
| 3,841,149 | 10/1974 | Edwin et al. | 364/551 X |
| 3,916,301 | 10/1975 | Vild et al. | 324/233 X |
| 3,939,404 | 2/1976 | Tait | 324/224 |
| 4,107,603 | 8/1978 | Slough | 324/207 |
| 4,164,864 | 8/1979 | Feller | 324/207 X |
| 4,259,867 | 4/1981 | Carlin | 73/761 |
| 4,260,986 | 4/1971 | Kobayashi et al. | 340/680 |
| 4,288,747 | 9/1981 | Kawagata et al. | 324/207 |
| 4,309,902 | 1/1982 | Sano et al. | 324/207 X |
| 4,460,869 | 7/1984 | Buser et al. | 324/227 X |
| 4,485,344 | 11/1984 | de Sivry et al. | 324/232 |

Primary Examiner—Gerard R. Strecker
Attorney, Agent, or Firm—Craig and Burns

[57] ABSTRACT

Technical functional components variable relatively to a starting position are examined by comparing an image of the component, produced by relative motion with respect to sensor means, with a corresponding earlier, stored image, and by triggering a warning signal in accordance with the congruence and/or the differences of the two images.

1 Claim, 4 Drawing Figures

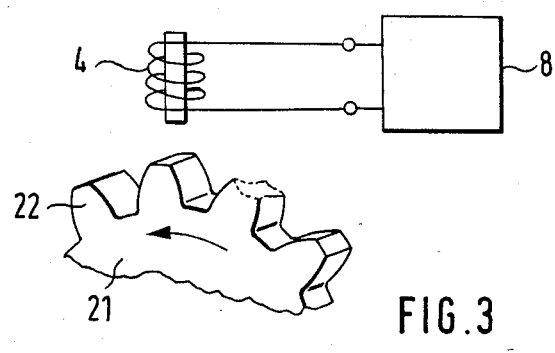
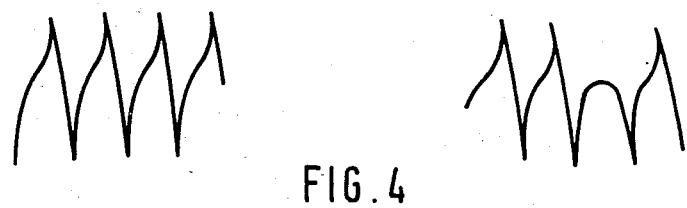
FIG.3
FIG.4

EXAMINATION PROCEDURE FOR THE SPATIAL CHANGE OF AN OBJECT WITH RESPECT TO ITS INITIAL CONDITION

The invention relates to a testing method and apparatus for technical functional components variable relatively to their starting position.

A process is known for quality control and indication of rejects in the tightening of threaded connections wherein the instantaneous values of torque and angle of rotation are determined in a number of points during the tightening procedure and are compared with predetermined torque-angle of rotation limit values. If these limit values are exceeded, indicating signals are produced (DOS [German Unexamined Laid-Open Application] No. 2,843,810). The conventional process does not yield any information on the strength of the threaded connection after completion of the tightening step.

The invention seeks to provide a testing method and apparatus for technical functional parts which makes it possible, with simple means, to give an indication of the position and/or positional change of the functional component.

The invention attains this by providing that an image of the component, produced by relative movement with respect to a sensor means, is compared with a corresponding earlier, stored image; and that a warning signal is triggered in correspondence with the congruence and/or the differences of the two images.

The basic idea of the invention resides in drawing a conclusion, from a comparison of the images of a technical functional component at an earlier point in time and at the present point in time, with respect to the movement or change in contour of the functional component in the meantime, and deriving a warning signal therefrom, if necessary. Possibilities for utilization are, for example, in connection with the gear wheels of chain drive mechanisms for testing, for example, wear and tear on the teeth; turbine buckets for determining outward migration of the buckets due to centrifugal forces, or bending due to cavitation; roller bearing cages; furthermore automatic conveyors in underground or strip mining; further wear of drilling and cutting tools; or testing of ram drive mechanisms in machine tools and/or testing of cam-shafts.

A comparison of the two images of the component makes it possible to recognize, in accordance with the resolution accuracy of the sensor means and of the comparison means, a change in the rotational position of this component and can yield a warning signal at an early point in time at which this change is as yet unrecognized, for example, by the human eye. On the other hand, a missing warning signal in case of a screw connection, for example, points to a high quality of the threaded connection and/or generally to a high positional stability.

The testing method can be performed in various ways. For example, the image can be produced at chronologically identical intervals. After comparison, such image can be stored instead of the preceding image. The earlier, storage image is thus always kept up to date. If the warning signal, upon its occurrence, is not immediately utilized for placing the component into the desired, original position, the number of warning signals can then permit a conclusion regarding the positional behavior of the component. An alternative testing method wherein the original image of the component forms the basis in all cases for the comparison, permits an indication from the number of warning signals as to the point in time that a positional error of the component occurred.

Various possibilities also exist for recording the images. As contrasted to a movement of the sensor past the fixed component, the reverse movement procedure offers advantages especially when examining rotating components. For example, such a fixed sensor means can also be provided subsequently at low cost.

Also the mode of operation of the sensor means can be based on various principles. Thus, the images for a metallic component can be produced by inductance. In this case, the sensor means is, for example, a simple coil wherein a voltage signal is produced by the component, lying above and below a medium value.

As an alternative, the images can also be produced, for example, optically or acoustically. The wavelength of the optic or acoustic signals transmitted by the sensor means can be outside of the visible or audible range. In either case, it is possible, for example, to determine the reflective characteristic of the component, or the spacing thereof with respect to the sensor means.

A device making it possible to conduct the process of this invention with simple means comprises a single sensor as the sensor means, this sensor being connected to a memory storage means.

It is thus an object of the invention to provide a method and apparatus for the testing of the technical functional effectiveness of moving components.

It is another object of the invention to provide method and apparatus for sensing a change of position of a moving component from which successive signals are generated representing repetitive sensings of a change in position of the component from which a display is produced of the signals whereby an indication of a warning may be effected in response to a change in the received sensed signals.

It is another object of the invention to produce method and apparatus for indicating optically or acoustically a change in the effectiveness of a moving component in response to sensed signals at least one of which is stored.

It is another object of the invention to produce a warning indication from a sensed signal of a change in configuration of a moving component only when the change sensed exceeds a predetermined value limit.

It is another object of the invention to produce a warning signal when the number of changes of configurations of plural components exceeds a predetermined limit.

It is another object of the invention to produce sensed signals of the change in distance of a component from the sensor in order to indicate a warning of a change in configuration of the component.

Figure 2:
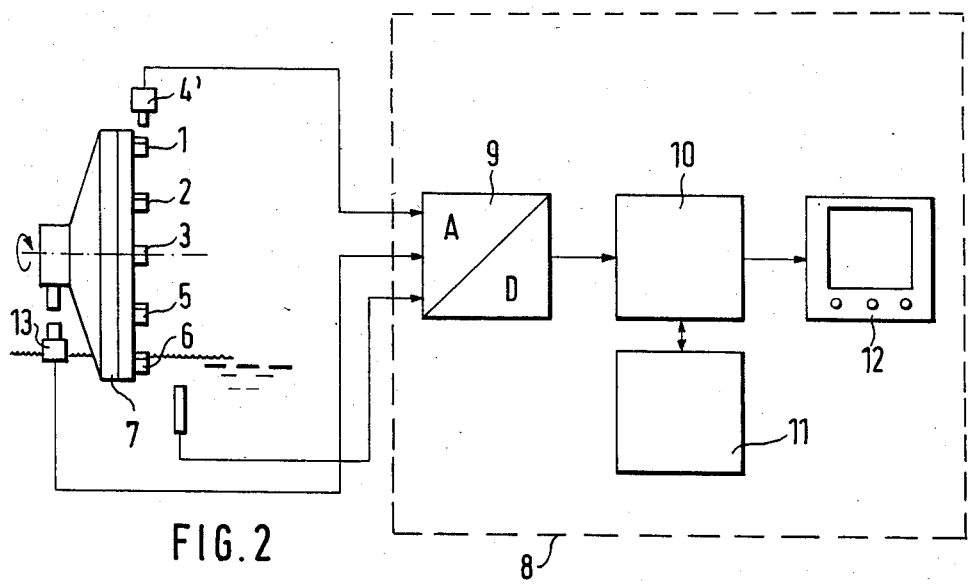

These and other objects, features, and advantages of the present invention will become more apparent from the following description when taken in connection with the accompanying drawings which show, for the purposes of illustration only, embodiments in accordance with the present invention, and wherein:

FIG. 1 shows obtaining an inductive image of a component of a threaded connection, FIG. 2 shows a testing device, by means of which such images in threaded connections are obtained at a rotating part and employed for a warning signal, FIG. 3 shows a testing device making it possible to monitor the toothed rim of the flywheel for an automotive vehicle, and FIG. 4 shows the images of the toothed rim of FIG. 3, obtained, for example, by inductance, prior to and after a predetermined operating period.

Before describing, in detail, the particular improved apparatus in accordance with the present invention, it should be observed that the present invention resides primarily in the novel structural combination of conventional components and not in the particular detailed configurations thereof. Accordingly, the structure, control, and arrangement of these conventional components are illustrated in the figures of the drawings by readily understandable block representations in order not to obscure the disclosure with structural details which would be readily apparent to those skilled in the art having the benefit of the description herein. Thus, the block diagram illustration of the figures of the drawings do not necessarily represent the mechanical structural arrangement of the exemplary system, but are primarily intended to illustrate the major structural components of this system in a convenient functional grouping so that the present invention can more readily be understood.

Turning to the figures wherein like reference numerals represent like parts, FIG. 1 shows the inductive images of three screw heads 1 through 3, produced while passing by an induction generator shown schematically as a coil 4. The image corresponds to the voltage induced in the coil 4 and is illustrated in correlation with the screw heads 1-3. By comparing the height of spike A with spike B, it can clearly be seen that the voltage peak produced by the corner X of the screw heads 1-3 in the closest proximity to the coil 4 is higher, the closer such a corner X is positioned with respect to the coil 4.

The rise and drop characteristic of the voltage and the amplitude and position of the voltage peaks relatively to the corresponding values for the other screw heads make it possible to give a clear indication regarding the rotational position of the screw heads 1-3, even directly in angular degrees. Upon a rotation of a screw head, the characteristic image is likewise altered. This change is utilized for triggering a warning signal by means of a device as schematically shown in FIG. 2.

The device makes it possible, for example, to test screw connections at the ring gear 7 or a rear axle transmission for automotive vehicles. The device consists of an inductance generator 4' corresponding to coil 4 of FIG. 1, fixedly arranged in the proximity of the screw heads 1-3 and 5 and 6 of the ring gear 7. The inductance generator 4' is connected to an analog/digital data processing system 8 comprising an analog-to-digital converter 9, a central unit 10, a memory 11, and a picture screen 12.

The converter 9 digitizes the images of the screw heads supplied according to FIG. 1 by the inductance generator 4' and transmits these data to the central unit 10.

Those skilled in the art will understand that sensing may take other forms than the inductance coil 4 shown in FIG. 1. Thus, an optical configuration may be used wherein a light source transmits light to the sensed member. Reflected light from the member is received at a photocell, the analog output signal of which is input to the analog/digital converter 9. Irregularities in the reflected and received signals due to a change in the parts sensor will result in corresponding irregularities in the signal digitized by converter 9.

At the beginning of the testing operation, the central unit 10 feeds these digitalized images of the screw heads into the memory 11. At chronologically regular intervals, the images of the screw heads 1-6 present at the ring gear 7 are now recorded during a complete revolution of the ring gear 7. The use of a trigger unit 13, which generates a synchronizing pulse at a fixed point, in each revolution of ring gear 7, ensures that the series of these images is always the same. The central unit 10 receives these instantaneous images of the screw heads 1-6 and compares same with the corresponding earlier images contained in the memory 11. In case of lack of congruence of one or several of these images with the corresponding, stored image, the central unit 10 produces a warning signal, on the picture screen 12, for example, an indication representing the form of the number of the loosened screw connections.

The invention permits continuous monitoring of screw connections for investigations regarding operational strength or prevention of damage in machines and installations. The invention makes it possible to recognize a twisting of the screws at even small angular degrees and aids in avoiding unnecessary repair and idle times for servicing operations as well as safety risks connected therewith. The corresponding device operates in a no-contact mode. Since the sensor can be fixedly mounted, no signal transmission from the sensor is required (such as a slip ring transmitter, for example). The invention can be utilized in all those cases where screw connections at rotationally or translationally moved parts represent a safety risk or a danger of failure, for example, besides utilization in an automotive vehicle, in turbines in power plants and in airplane engines. The warning signal can also be provided in such a way that the machine or installation is forcibly arrested upon the occurrence of an excessive change in the rotational position of the monitored screw or securing component.

The flywheel 21 for an automotive vehicle, shown in a fragmentary view in FIG. 3, carries teeth 22 at regular intervals along its circumference; these teeth are engaged by a pinion, not shown, of a starter motor. An image 22', FIG. 4, of the teeth 22 is obtained upon rotation of the flywheel 21 with the aid of an inductance generator, shown schematically as a coil 4 and being fixedly mounted. This image 22' is shown in the left-hand portion of FIG. 4, for example, for the newly manufactured state of the flywheel 21 and of the teeth 22. After a predetermined operating period, the images of the teeth 22 are again recorded. FIG. 3 shows in dashed lines a damaged tooth 23, produced in the meantime, for example, by improper meshing of the starter pinion. The image obtained with the aid of coil 4, as illustrated in the right-hand portion of FIG. 4, differs with respect to the earlier image at the point 23' corresponding to the damaged tooth 23. With the aid of an analog/digital data processing system 8, a determination can be made, with a comparison of the two images reproduced in FIG. 4, of which tooth 23 is defective, and of the extent of such defect. The latter can be derived in first approximation from a comparison of the amplitudes of the corresponding output signals of coil 4 in the two images for the damaged tooth 23.

If the thus-discovered defect, or the number of defective teeth, exceeds a predetermined extent, an optical or acoustical warning signal can be triggered.

It will be appreciated to those skilled in the art that the central unit 10 as shown in FIGS. 2 and 3 may take a variety of forms. As an example, a micro-processor may be employed. In one form, it may consist of one or more chips, the electronic architecture of which includes input and output circuitry, an arithmetic unit admitting of at least four-function arithmetic operations with attendant logic operations, memory and a program control unit. Such a configuration may be tailored to the particular test configuration desired with pre-stored program and data representing the data characteristics required for testing.

Advantageously, such a configuration may also admit a manual control whereby the program and data may be changed, if desired, by way of a keyboard.

While higher level languages, such as FORTRAN and BASIC may be used, characteristically, economy of memory use and increased speed may be effected by the well known expedient of employing a lower-level language such as ASSEMBLY language or MACHINE language peculiar to the particular processor used.

Choice of architecture for the micro-processor, with language and programming technique, it will be recognized, is within the skill of those working in the art, and accordingly, the details thereof will not be introduced to this disclosure except insofar as the nature of the invention requires.

In the exemplary configuration of the invention shown in FIGS. 1-4, damage may occur to bolt heads 1-6 of FIG. 1 (teeth 23, FIG. 3) which is sufficiently minor so as not to necessitate the triggering of a warning signal. Accordingly, a value I representing a threshold degree of damage allowable, may be stored in the memory of central unit 10 against which the received signals may be compared to determine whether a warning signal must be triggered.

Further, where a few, for example, one or more, bolt heads 1-6 (or teeth 23) may be significantly damaged, it may be desirable to set a limit II of the number of elements damaged (or changed) in a ring gear as a threshold value to signal a further warning. Such a number II may be stored in an additional storage register in the memory of the central unit 10.

The operation of the central unit 10 may thus take the form of a series of steps programmed to process incoming data as follows:

(1) By means of an input keyboard, the limit values I, representing a threshold degree of damage for a single bolt head (or other elements sensed) and limit value II presenting the number of damaged bolt heads or teeth (or other elements sensed), are set into respective storage registers for these values. Alternatively, the input values may be stored during chip manufacture.

(2) Upon the receipt of a pulse from trigger unit 13, FIG. 2, the central processing unit (CPU) of the central unit 10 stores successive values for the signals received from inductance generator 4' representing the successive passes of the elements, or screw heads, 1-6 (teeth for FIGS. 3 and 4) in front of inductance generator 4', in memory.

(3) At a subsequent occurrence of a pulse from trigger unit 13, a new set of digitized signals from inductance generator 4' representing subsequent passes of the bolt corners X for bolts 1-6 are recorded in memory. While the central unit 10 may store individual values representing a magnitude of the peaks at points A and B, it will be appreciated that an alternative mode may comprise sensing multiple values which occur between the peaks. Thus, as shown in FIG. 1, values of the signal may be sensed at points $A_1$, $A_2$, $A_3$–$A_9$, A. In this mode, ten values would be stored for each signal, the sum of which represents the time integral under the curve. While ten divisions have been disclosed, those skilled in the art will recognize that this is exemplary only, and that any number of time divisions may be selected.

The values so stored may then be used to display a graphical image on the picture screen or cathode ray tube, a graphical image such as that shown in FIG. 4.

In a configuration where, as described above, multiple samplings $A_1$–$A_9$, A, have been stored, all such values may be summed to produce a value which is representative of one cycle such as 22', corresponding to the cycle A. A comparable summing of the signals for the B cycle will produce a value representative of B.

It will be appreciated that the time between the storing of corresponding data of steps 2 and 3 may represent immediately succeeding revolutions of the ring gear 7, as would be effected if continuous monitoring is desired. Alternatively, a significant amount of time may lapse between the two successive samplings of data, for example, a period of one hour, a day, week or month, or a longer period may be effected. At this point, the memory of central unit 10 has corresponding sets of data representing the passages of bolts 1-6 (or teeth, FIGS. 3 and 4) past inductance generator 4'. If, during the time lapse between the two sensing cycles, damage has occurred to one or more of the members 1-6, the data stored will not match.

(4) The arithmetic unit of central unit 10 compares the digital values for corresponding passes of the same element, thus, the digital values stored in memory for the first and successive passes of screw head 1 are compared, that is, subtracted. If the digital value for the later pass is less than the digital value for the first pass, the difference represents a changed bolt head, FIG. 1, or damaged tooth, FIG. 4.

(5) The stored values for the A cycle and the B cycle, when presented visually on the picture screen 12, FIG. 2, serve as an alarm if any of the cycles, for example, the B cycle, deviate from the norm.

Alternatively, the CPU of central unit 10 may serve to activate a separate alarm, optical or acoustical. For this purpose, the CPU of central unit 10 may compare the difference value determined in step (4) with the limit value I stored in step (1). If this subtraction step produces a zero or a plus value, this indicates that the damage to the tooth in question does not exceed the limit I and accordingly, the CPU transmits no alarm.

(6) If, on the other hand, a negative value is the result of the comparison in step (5), the CPU of central unit 10 may activate a first alarm indicating damage or change for a single bolt head (or tooth). The CPU will record a "1" in a storage register in memory set aside to record the number of bolt heads or teeth damaged, or changed in a particular revolution. If in a single revolution in the ring gear 7, one, two or three bolt heads exceed the limit I, a corresponding value 1, 2 or 3, will stand in the storage register.

(7) At the receipt of a subsequent signal from trigger unit 13 after the second pass of the ring gear 7, the value standing in the storage register referred to in step (6), is compared with the limit value II standing in the II register. By subtracting the storage register value from the limit value II, if the result is zero or a plus value, the limit has not been exceeded, and accordingly, the CPU activates no alarm.

(8) If, on the other hand, a negative value results, this represents the fact that the number of bolt heads or teeth damaged exceeds the threshold value set and a warning signal to this effect, either optical or acoustical, may be actuated by the CPU.

The CPU may issue warning signals for both a single tooth or for a total number of teeth damaged as the artisan may desire merely by generating an output to the warning device in step (5) (or step (7)) or both.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A testing method for the configuration of technical functional components, each component having a first axis of rotation, said components being rotatable about a second axis, comprising the steps of
   successively rotating said components about said second axis,
   sensing rotation about said first axis of an entire configuration of each component during said successive rotations about said second axis,
   generating successive first signals in response to said sensing, each of the successive first signals representing a sensed configuration of the component,
   comparing successive first signals for producing a second signal representative of a change in an entire configuration of each of said components resulting from rotation of a component about the first axis during rotation about the second axis, and
   triggering a warning signal in response to one of a congruence and a difference in said first signals.

* * * * *